United States Patent
Kim et al.

(10) Patent No.: US 8,281,225 B2
(45) Date of Patent: Oct. 2, 2012

(54) DIGITAL DATA CODING AND RECORDING APPARATUS, AND METHOD OF USING THE SAME

(75) Inventors: Dae-Woong Kim, Seoul (KR); Soo-Wong Lee, Gyeonggi-do (KR); Hyun-Woong Lee, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 974 days.

(21) Appl. No.: 12/325,588

(22) Filed: Dec. 1, 2008

(65) Prior Publication Data

US 2009/0089647 A1     Apr. 2, 2009

Related U.S. Application Data

(62) Division of application No. 11/121,884, filed on May 4, 2005, now Pat. No. 7,461,327.

(30) Foreign Application Priority Data

May 4, 2004    (KR) ................ 2004-31352

(51) Int. Cl.
    *G11C 29/00*    (2006.01)
    *H03M 13/00*   (2006.01)
(52) U.S. Cl. ................ 714/769; 714/758
(58) Field of Classification Search ........... 714/769, 714/758
    See application file for complete search history.

(56) References Cited

U.S. PATENT DOCUMENTS

| | | | | |
|---|---|---|---|---|
| 4,680,764 A | * | 7/1987 | Suzuki et al. | 714/756 |
| RE33,462 E | * | 11/1990 | Suzuki et al. | 714/756 |
| 4,998,252 A | * | 3/1991 | Suzuki et al. | 714/756 |
| 5,200,943 A | * | 4/1993 | Sano et al. | 369/47.22 |
| 5,499,224 A | * | 3/1996 | Sanada | 369/47.2 |
| 5,499,252 A | * | 3/1996 | Watanabe | 714/769 |
| 5,592,450 A | * | 1/1997 | Yonemitsu et al. | 386/241 |
| 5,627,844 A | * | 5/1997 | Cho | 714/759 |
| 5,694,383 A | * | 12/1997 | Arataki et al. | 369/47.32 |
| 5,768,286 A | * | 6/1998 | Hsu et al. | 714/719 |
| 5,841,749 A | * | 11/1998 | Sako | 369/59.26 |
| 5,987,630 A | * | 11/1999 | Yamawaki | 714/701 |
| 6,048,090 A | * | 4/2000 | Zook | 714/755 |
| 6,167,551 A | * | 12/2000 | Nguyen et al. | 714/770 |

(Continued)

FOREIGN PATENT DOCUMENTS

JP    05-234265    9/1993

(Continued)

OTHER PUBLICATIONS

First Office Action issued in corresponding Japanese Appln. No. 2005-133175 dated Aug. 3, 2010.

*Primary Examiner* — Joseph D Torres
(74) *Attorney, Agent, or Firm* — F. Chau & Associates, LLC

(57) ABSTRACT

A data coding apparatus and method for recording digital data on a storage device are provided, where the recording apparatus reduces the number of times that memory is accessed by storing only additional information and parity information when ECC encoded data are temporarily stored in an external memory, and performs data coding without any clock loss by scrambling only a specific field on-the-fly when the data stored in the external memory are read.

8 Claims, 4 Drawing Sheets

U.S. PATENT DOCUMENTS

| | | | |
|---|---|---|---|
| 6,253,349 B1 * | 6/2001 | Maeda et al. | 714/799 |
| 6,263,443 B1 * | 7/2001 | Anderson et al. | 726/1 |
| RE37,327 E * | 8/2001 | Yonemitsu et al. | 386/243 |
| 6,289,102 B1 * | 9/2001 | Ueda et al. | 380/201 |
| 6,470,473 B1 * | 10/2002 | Iwasa | 714/785 |
| 6,742,156 B2 * | 5/2004 | Shieh | 714/756 |
| 6,751,771 B2 * | 6/2004 | Chuang et al. | 714/784 |
| 6,772,386 B2 * | 8/2004 | Iwata et al. | 714/755 |
| 6,920,135 B1 * | 7/2005 | Lea | 370/389 |
| 6,925,285 B2 * | 8/2005 | Kim | 455/3.02 |
| 6,963,296 B2 * | 11/2005 | Oki et al. | 341/106 |
| 7,000,172 B2 * | 2/2006 | Shieh | 714/785 |
| 7,007,221 B2 * | 2/2006 | Nagai et al. | 714/755 |
| 7,114,115 B2 * | 9/2006 | Nagai et al. | 714/755 |
| 7,139,962 B2 * | 11/2006 | Lin et al. | 714/758 |
| 7,155,015 B2 * | 12/2006 | Katayama et al. | 380/267 |
| 7,162,676 B2 * | 1/2007 | Coleman et al. | 714/752 |
| 7,225,385 B2 * | 5/2007 | Lin et al. | 714/755 |
| 7,286,669 B2 * | 10/2007 | Nishizaki | 380/255 |
| 7,907,573 B2 * | 3/2011 | Lee et al. | 370/334 |

FOREIGN PATENT DOCUMENTS

| | | |
|---|---|---|
| JP | 2001-156649 | 6/2001 |
| JP | 2003-263844 | 9/2003 |

* cited by examiner

DIGITAL DATA CODING AND RECORDING APPARATUS, AND METHOD OF USING THE SAME

CROSS-REFERENCE TO RELATED APPLICATION

This application is a Divisional of U.S. patent application Ser. No. 11/121,884, filed on May 4, 2005, now U.S. Pat. No. 7,461,327 and entitled "DIGITAL DATA CODING APPARATUS, DVD RECORDING APPARATUS, AND METHOD OF USING THE SAME", which, in turn, claims foreign priority under 35 U.S.C. §119 to Korean Patent Application No. 10-2004-0031352, filed on May 4, 2004, in the Korean Intellectual Property Office, the disclosures of which are incorporated by reference herein in their entireties.

BACKGROUND OF THE INVENTION

1. Field of the Invention

The present disclosure relates to digital recording apparatus, and more particularly, to digital data coding apparatus and recording apparatus capable of reducing the number of times a memory device is accessed in order to code digital data to be recorded on a storage device.

2. Description of the Related Art

For example, one common type of storage device is a Digital Versatile Disk (DVD). A DVD system generally processes data in units of data sectors, including an error correction code (ECC) block. The ECC block facilitates mass data transmission without errors.

Each data sector includes 12 rows of 172 bytes. A first field of the data sector includes ID data, IED data, and CPR_MAI data, and a last field of the data sector includes an error detection code (EDC). An ECC block of a DVD includes an information field having the data sector, 10 bytes of parity in (PI) parity, and 16 rows of parity out (PO) parity used to correct data errors of the information field.

FIG. 1 illustrates the structure of a data sector 100 to be recorded on a DVD. Referring to FIG. 1, user data or main data to be recorded on the DVD from a host computer are classified in units of 2048 bytes. The data sector 100 comprises 4 bytes of ID data indicating address information for each data sector and sector power, 2 bytes of IED data that is an EDC of the ID data, and 6 bytes of CPR_MAI data indicating a reserve field or copyright management information. A first row of the data sector 100 includes 160 bytes of main data D0 through D159. Each of second through eleventh rows includes 172 bytes of main data and a twelfth row includes 168 bytes of main data D1880 through D2047 and 4 bytes of EDC data. Each data sector consists of 2064 bytes (2048 bytes+16 bytes), that is, twelve 172-byte rows.

FIG. 2 illustrates the structure of an ECC block 200 comprising a plurality of the data sectors 100 shown in FIG. 1. Referring to FIG. 2, the ECC block 200 contains sixteen of the data sectors 100 to which ECC is added by calculating a Reed-Solomon code. The ECC block is recorded on the DVD to maintain data reliability. The ECC block is formed by calculating a Reed-Solomon code of one block that is formed from 16 data sectors and adding ECC.

The ECC block includes 10 bytes of ECC calculated from each row of the 16 data sectors in a horizontal direction, and the calculated ECC is added to the back of each corresponding row. A column of the added ECC forms a PI parity block having a size of 10 bytes×192 rows. The ECC block further includes 16 bytes of ECC calculated from each column of the data sectors and the PI parity block, and the calculated ECC is added in a vertical direction to the bottom of each corresponding column. The row of the added ECC forms a PO parity block having a size of (172+10) bytes×16 rows. Therefore, one digital data block to be recorded on the DVD is 182 bytes×208 rows=37,856 bytes.

An external memory device for temporarily storing data is required to process a signal used to code and modulate main data transmitted from a host computer. SDRAM is used as the external memory device. An integrated circuit (IC) is used for coding data to be recorded to the DVD. The IC must frequently access the SDRAM in order to store the data into the SDRAM, and in order to read and process the stored data to be recorded to the DVD.

FIG. 3 is a diagram illustrating a process of accessing external memory in a conventional DVD recording apparatus. Referring to FIG. 3, a recording apparatus 300 for recording digital data to a DVD includes a DVD recorder IC 301 and external memory or SDRAM 303. Main data transmitted from a host computer are stored in the SDRAM 303 at step 305. The DVD recorder IC 301 accesses the SDRAM 303 32,768 times (2048×16 sectors) per data block.

The main data stored in the SDRAM 303 are read and ECC encoded at step 307. The number of times when the SDRAM 303 is accessed is 2048×16 sectors=32,768 times per data block at step 307, which is equal to the number of times for storing the main data. The DVD recorder IC 301 adds 4 bytes of ID data, 2 bytes of IED data, and 6 bytes of CPR_MAI data to each data sector, performs an EDC operation and adds the EDC. Each data sector contains 2064 bytes including 16 bytes of additional information added to 2048 bytes of main data. Thereafter, the data is scrambled. The scrambled data are ECC encoded in data block units by adding 10 bytes of PI parity to each row and adding 16 rows of PO parity to the block containing the PI parity. (10×192) bytes of PI parity and (182×16) bytes of PO parity are added as shown in FIG. 2. Thus, one data block contains 182 bytes×208 rows=37,586 bytes.

The encoded data are stored in the SDRAM 303 at step 309. At this time, the DVD recorder IC 301 accesses the SDRAM 303 37,856 times per data block.

The DVD recorder IC 301 reads the data stored in the SDRAM 303 to perform eight-to-fourteen modulation (EFM) at step 311. At this time, the DVD recorder IC 301 accesses the SDRAM 303 37,856 times per data block.

The DVD recorder IC 301 performs the EFM for the read data and records the modulated data on the DVD. Digital data are recorded on the DVD at a predetermined speed. The DVD recorder IC 301 must read and store data in the SDRAM 303, which is an external buffer memory, within a designated time.

However, as DVD recording apparatuses record data at higher speeds, the rate at which data is to be accessed from the external buffer memory must be increased. Therefore, when mass data are recorded on a DVD-RAM at high speed, it is important to reduce the number of times the external buffer memory is accessed with a disk recording speed of high transmission rate.

SUMMARY OF THE INVENTION

Exemplary embodiments of the present disclosure provide high-speed recording apparatus and methods of using the same in which the number of times a recorder IC accesses an external buffer memory can be reduced.

A preferred embodiment of the present disclosure provides a recording apparatus and a method using the same by which a whole recorder system can obtain a bandwidth gain when the recorder system is implemented as a system on chip (SOC).

According to an aspect of the present disclosure, there is provided a method of recording data on a storage device, the method comprising: recording main data to be recorded on the storage device in a memory device; reading the recorded main data from the memory device to error correction code (ECC) encode the main data; ECC encoding and scrambling the main data; recording additional address information and parity information included in the ECC encoded and scrambled data except the main data to the memory device; and reading the address information, the parity information, and the main data stored in the memory device and scrambling the read data to perform eight to fourteen modulation (EFM) on the main data.

The additional address information and the parity information may include an ID, error detected code (EDC) of the ID (IED), CPR_MAI, EDC parity, and ECC parity except the main data.

The scrambling of the main data is performed on-the-fly and the reading of the address information, the parity information, and the main data and the scrambling of the main data on-the-fly are performed simultaneously.

According to another aspect of the present disclosure, there is provided a method of coding digital data to be recorded on a storage device, the method comprising: recording main data to be recorded on the storage device in a memory device; reading the recorded main data from the memory device to ECC encode the main data; ECC encoding and scrambling the main data; recording additional address information and parity information included in the ECC encoded and scrambled data except the main data to the memory device; and reading the address information, the parity information, and the main data stored in the memory device and scrambling the read data to perform EFM on the main data.

According to another aspect of the present disclosure, there is provided an apparatus for recording digital data on a storage device, the apparatus comprising: a memory device for temporarily storing data to be recorded on the storage device; an ID generation circuit for adding an ID and IED of the ID for each of a plurality of data sectors; an EDC generation circuit for adding EDC of the data to each of the data sectors; a first scramble circuit for scrambling the data in data sector units; an ECC encoding circuit for adding PI parity and PO parity to the scrambled data in sector units and ECC encoding the added data; and a second scramble circuit for separately reading main data, the ID, IED, EDC parity, and ECC parity from the memory device and scrambling the read data, wherein additional information besides the main data included in the ECC encoded and scrambled data is stored in the memory device and, when the main data are read from the memory device to perform EFM on the main data, the address information, the parity information and the main data stored in the memory device are read and scrambled by the second scramble circuit.

The second scramble circuit scrambles the main data field on-the-fly and reads the main data and the ID, IED, EDC parity and ECC parity simultaneously.

BRIEF DESCRIPTION OF THE DRAWINGS

The above and other features and advantages of the present disclosure will become more apparent by describing in detail exemplary embodiments thereof with reference to the attached drawings, in which.

DETAILED DESCRIPTION OF PREFERRED EMBODIMENTS

Figure 1:
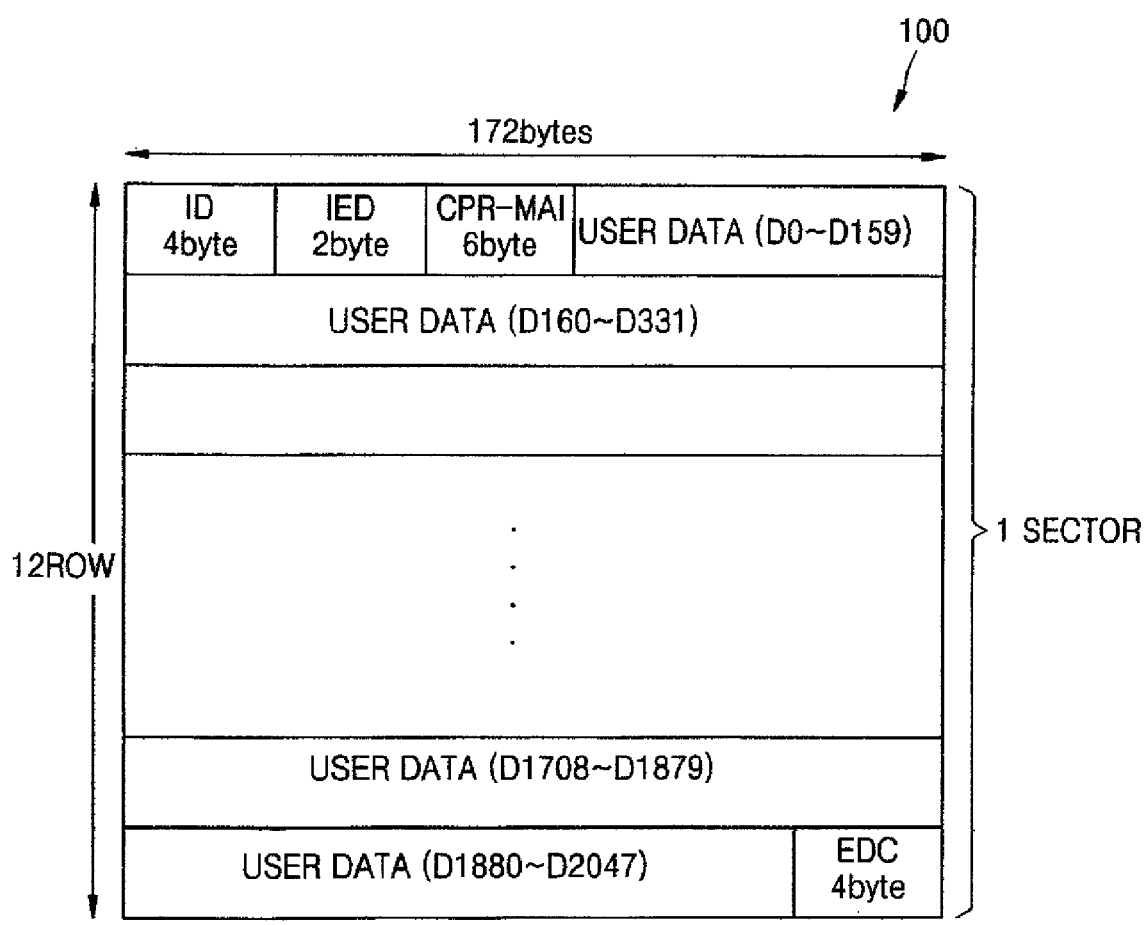
FIG. 1 is a schematic diagram that illustrates the structure of a sector of digital data to be recorded on a storage device.

Hereinafter, the present disclosure is described more fully with reference to the accompanying drawings, in which embodiments of the disclosure are shown. Like reference numerals in the drawings may denote like elements.

Figure 4:
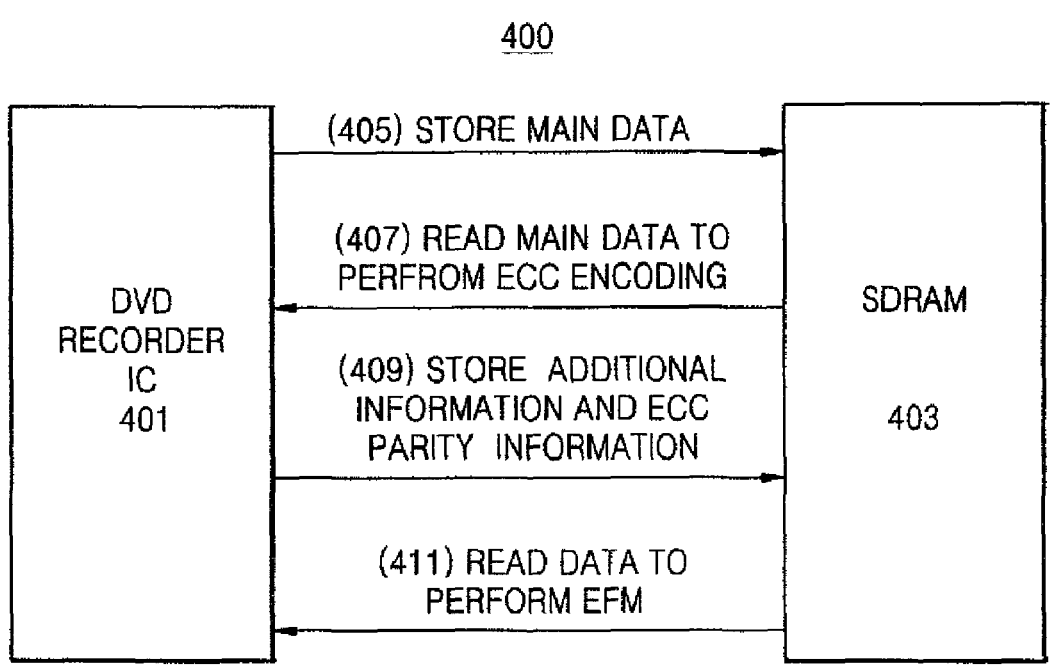
FIG. 4 is a schematic diagram illustrating a process of accessing external memory in a recording apparatus according to an embodiment of the present disclosure.

FIG. 4 shows a process of accessing external memory in a recording apparatus according to an exemplary embodiment of the present disclosure. Referring to FIG. 4, a recording apparatus and method 400 for recording digital data on a storage device, such as a digital versatile disk (DVD), for example, includes a recorder integrated circuit (IC) 401 and an external buffer memory or SDRAM 403. The recorder IC 401 receives data transmitted from a host computer and stores the received data in the SDRAM 403 at step 405. The recorder IC 401 accesses the SDRAM 403 32,768 times (2,048×16 sectors) per data block at step 405.

The recorder IC 401 reads main data stored in the SDRAM 403, adds various pieces of additional information to the read main data, and scrambles and ECC encodes the added data at step 407. To this end, the recorder IC 401 accesses the SDRAM 403 32,768 times (2,048×16 sectors) per data block, which is equal to the number of times the recorder IC 401 accesses the SDRAM 403 to store the data.

Figure 2:
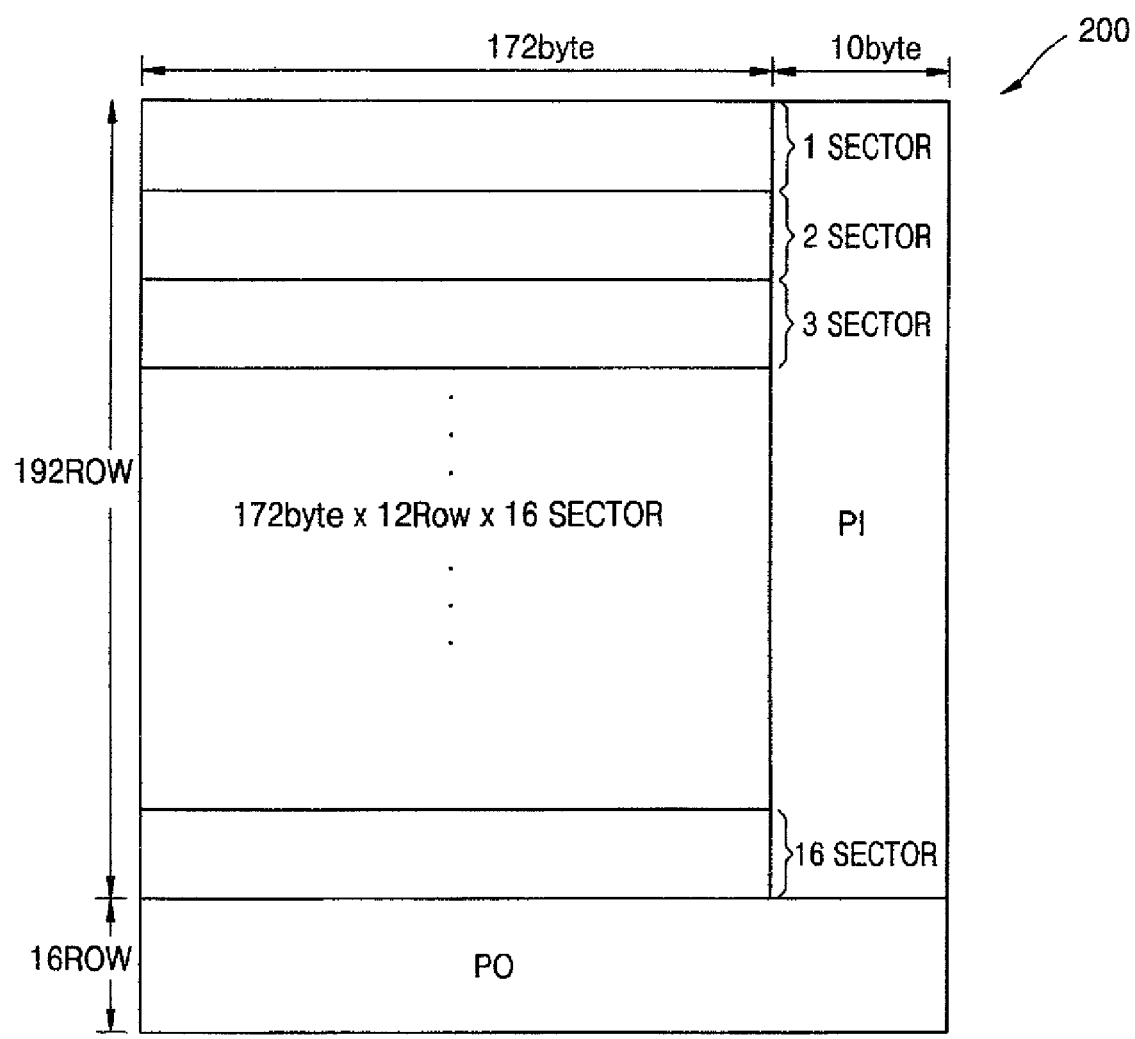
FIG. 2 is a schematic diagram that illustrates the structure of an ECC bock comprising a plurality of the data sectors shown in FIG. 1.
Figure 3:
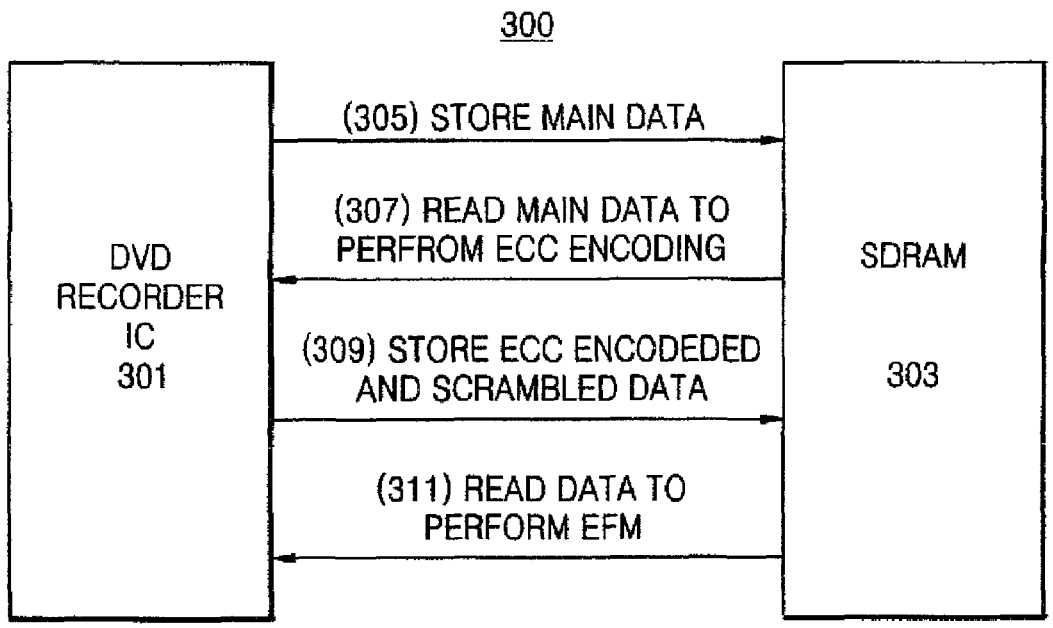
FIG. 3 is a schematic diagram illustrating a process of accessing external memory in a conventional recording apparatus.

The recorder IC 401 adds 4 bytes of ID data, 2 bytes of IED data, and 6 bytes of CPR_MAI data to each data sector and performs an EDC operation and adds the EDC. Each data sector contains 2,064 bytes including 16 bytes of additional information added to 2,048 bytes of main data. Thereafter, the data is scrambled. The scrambled data are ECC encoded in units of data blocks by adding 10 bytes of PI parity to each row and adding 16 rows of PO parity to the block containing the PI parity. (10×192) bytes of PI parity and (182×16) bytes of PO parity are added as shown in FIG. 2. Thus, one data block contains 182 bytes×208 rows=37,586 bytes.

Among the encoded data, additional information other than main data is stored in the SDRAM 403 at step 409, where the additional information includes ID data, IED data, CPR_MAI data, EDC parity and ECC parity. At this time, the recorder IC 401 accesses the SDRAM 403 5,088 times per data block ((4+2+4+6)×16 bytes comprising ID data, IED data, CPR_MAI data, EDC data)+10×192 (PI parity)+182× 16 (PO parity)). Therefore, the number of times the SDRAM 403 is accessed is reduced by 12% by storing only additional information rather than all encoded data.

The recorder IC 401 reads the main data and the additional information stored in the SDRAM 403 and ECC parity information to perform eight to fourteen modulation (EFM) at step 411. At this time, the recorder IC 401 can scramble only a main data field on-the-fly simultaneously while reading the main data, additional information, and ECC parity information, thereby obtaining a reading result equal to a conventional result without any clock loss. In addition, the recorder IC 401 can determine an initial value of a scramble linear feedback shift register (LFSR) while reading the ID information.

At this time, the recorder IC 401 accesses the SDRAM 403 37,856 times per data block. The recorder IC 401 performs the EFM for the read data and records the modulated data on the storage device.

Figure 5:
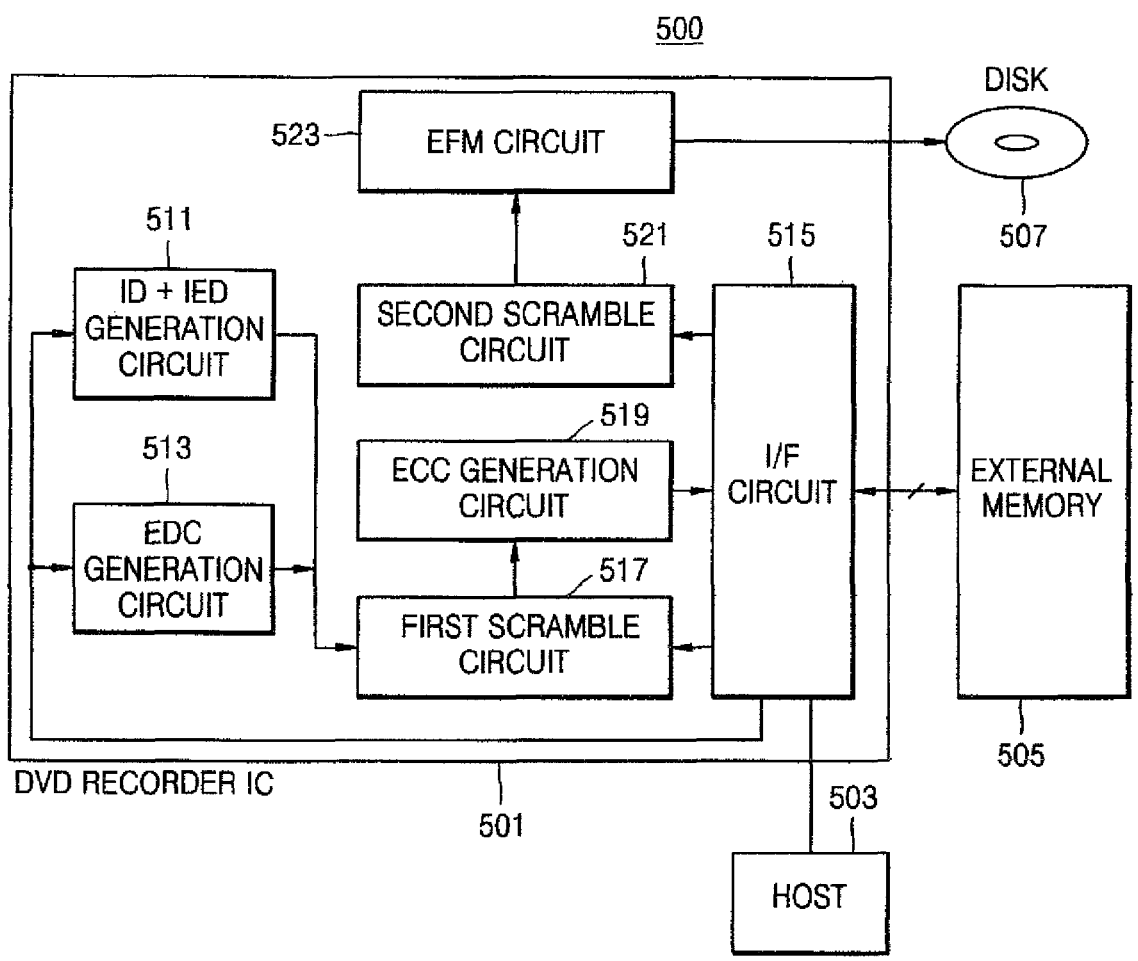
FIG. 5 is a block diagram of a recording apparatus according to an embodiment of the present disclosure.

FIG. 5 is a block diagram of a recording apparatus according to an embodiment of the present disclosure, which is indicated generally by the reference numeral. Referring to FIG. 5, the recording apparatus 500 comprises a recorder IC 501, a host 503, and an external memory 505.

The recorder IC 501 receives digital data from the host 503, codes the received digital data, and records the coded digital data on a storage device 507. The external memory 505 temporarily stores digital data while the recorder IC 501 codes the received digital data.

The recorder IC 501 includes an ID+IED generation circuit (hereinafter, referred to as an ID generation circuit) 511, an EDC generation circuit 513, an I/F circuit 515, a first scramble circuit 517, an ECC generation circuit 519, a second scramble circuit 521, and an EFM circuit 523.

The ID generation circuit 511 generates ID information, EDC of the ID information (IED data), and copyright information (CPR_MAI data) in data sector units. The EDC generation circuit 513 generates the EDC of data in data sector units. The I/F circuit 515 provides an interface between the recorder IC 501 and external devices 503 and 505 to transmit/receive data.

After additional information is added to the data and the added data are ECC encoded, the I/F circuit 515 stores only additional information and ECC parity information in the external memory 505.

The first scramble circuit 517 scrambles the main data in data sector units read from the external memory 505. The ECC generation circuit 519 receives the scrambled data and the information on ID, IED, CPR_MAI and EDC, combines the additional information with the main data, divides the combined data into bit streams with a predetermined length, and generates and adds the EDC of the bit stream divided into the bit streams with the predetermined length.

When the recorder IC 501 separately reads the additional information including the main data, the ID information, and the ECC parity, the second scramble circuit 521 scrambles a predetermined field, i.e., the main data field, on-the-fly and transmits the scrambled data to the EFM circuit 523. The EFM circuit 523 modulates the 8-bit scrambled data into 14-bit data and outputs the modulated data to the storage device 507.

Referring to FIGS. 4 and 5, a digital data recording operation is now described. The host 503 transmits user digital data, i.e., main data, to be recorded on the storage device 507 to the recorder IC 501. The recorder IC 501 temporarily stores the main data in the external memory 505. The first scramble circuit 517 combines the main data read from the external memory 507 with the ID, the IED, the CPR_MAI and the EDC parity generated by the ID generation circuit 511 and the EDC generation circuit 513, and scrambles the combined data. The ECC generation circuit 519 performs an ECC operation and adds the ECC to the scrambled data to maintain reliability of the digital data. The data generated by the ECC generation circuit 519 consists of sixteen data sectors or one data block to generate ECC parity.

Meanwhile, when the ECC encoded data are temporarily stored in the external memory 505, the external memory 505 does not store all the encoded data, but only the additional information and the parity, and not the main data.

When the recorder IC 501 reads data from the external memory 505 again to perform the EFM of the digital data, it scrambles a specific field, i.e., only a main data field, by an on-the-fly method, while reading the main data, the additional information, and the parity information. At this time, the recorder IC 501 can determine an initial value of the scramble LFSR while reading the ID information.

The number of times the recording apparatus 500 accesses the external memory 505 can be considerably less than the number of times a conventional recording apparatus accesses an external memory. The second scramble circuit 521 makes it possible to obtain the same data coding result as the conventional data coding result without any clock loss using the on-the-fly method.

In the recording apparatus and the recording method shown in FIGS. 4 and 5, a digital data coding apparatus and a digital data coding method to record digital data on a storage device are provided.

The circuit shown in FIG. 5 can be implemented as one chip, i.e., a system on chip (SOC), thereby reducing the number of times the external memory 505 is accessed and increasing the bandwidth of a whole recording system.

The digital data coding method and the digital data recording method make it possible to reduce the number of times an external memory is accessed and implement a high-speed recording system. When the recording system is implemented as a SOC, the number of times the external memory is accessed is reduced to increase the bandwidth of the system.

While the present invention has been particularly shown and described with reference to exemplary embodiments thereof, it will be understood by those of ordinary skill in the pertinent art that various changes in form and details may be made therein without departing from the spirit and scope of the present invention as defined by the following claims.

What is claimed is:

1. An apparatus for recording digital data on a digital versatile disk (DVD), the apparatus comprising:
   a memory device for temporarily storing data to be recorded on the DVD;
   an ID generation circuit for adding an ID and IED of the ID for each of a plurality of data sectors,
   an EDC generation circuit for adding EDC of the data to each of the data sectors;
   a first scramble circuit for scrambling the data in data sector units;
   an ECC encoding circuit for adding PI parity and PO parity to the scrambled data in sector units and ECC encoding the added data; and
   a second scramble circuit for separately reading main data, the ID, IED, EDC parity, and ECC parity from the memory device and scrambling the read data,
   wherein additional information besides the main data included in the ECC encoded and scrambled data is stored in the memory device and, when the main data are read from the memory device to perform EFM on the main data, the address information, the parity information and the main data stored in the memory device are read and scrambled by the second scramble circuit.

2. The apparatus of claim 1, further comprising an EFM circuit for performing the EFM on the digital data.

3. The apparatus of claim 1, wherein the second scramble circuit scrambles the main data field in an on-the-fly manner and reads the main data and the ID, IED, EDC parity, and ECC parity simultaneously.

4. The apparatus of claim 3, wherein the ECC encoding circuit:
divides the main data into bit streams containing 2048 bytes each and adds 4 bytes of ID data indicating address information of each sector and sector power, 2 bytes of IED data that is EDC for the 4 bytes of ID data, 6 bytes of CPR_MAI data indicating copyright management information, and 4 bytes of EDC to each bit stream to form one data sector; and
adds parity inner (PI) parity information to each sector and parity outer (PO) parity information to sixteen of the data sectors and to the PI parity information to form one data block.

5. The apparatus of claim 1, wherein the ID generation circuit, the EDC generation circuit, the first and second scramble circuits, and the ECC encoding circuit constitute a data coding IC and the memory device is an SDRAM memory device.

6. An apparatus for coding digital data to be recorded on a digital versatile disk (DVD), the apparatus comprising:
a memory device for temporarily storing data to be recorded on the DVD;
an ID generation circuit for adding an ID and IED of the ID for each of a plurality of data sectors;
an EDC generation circuit for adding EDC of the data to each of the data sectors;
a first scramble circuit for scrambling the data in data sector units;
an ECC encoding circuit for adding PI parity and PO parity to the scrambled data in sector units and ECC encoding the added data; and
a second scramble circuit for separately reading main data, the ID, IED, EDC parity, and ECC parity from the memory device and scrambling the read data,
wherein additional information besides the main data included in the ECC encoded and scrambled data is stored in the memory device and, when the main data are read from the memory device to perform EFM on the main data, the address information, the parity information and the main data stored in the memory device are read and scrambled by the second scramble circuit.

7. The apparatus of claim 6, wherein the second scramble circuit scrambles the main data field in an on-the-fly manner and reads the main data and the ID, IED, EDC parity, and ECC parity simultaneously.

8. The apparatus of claim 7, wherein the ECC encoding circuit:
divides the main data into bit streams containing 2048 bytes each and adding 4 bytes of ID data indicating address information of each sector and sector power, 2 bytes of IED data that is EDC for the 4 bytes of ID data, 6 bytes of CPR_MAI data indicating copyright management information, and 4 bytes of EDC to each bit stream to form one data sector; and
adds parity inner (PI) parity information to each sector and parity outer (PO) parity information to sixteen of the data sectors and to the PI parity information to form one data block.

* * * * *